Figure 1:
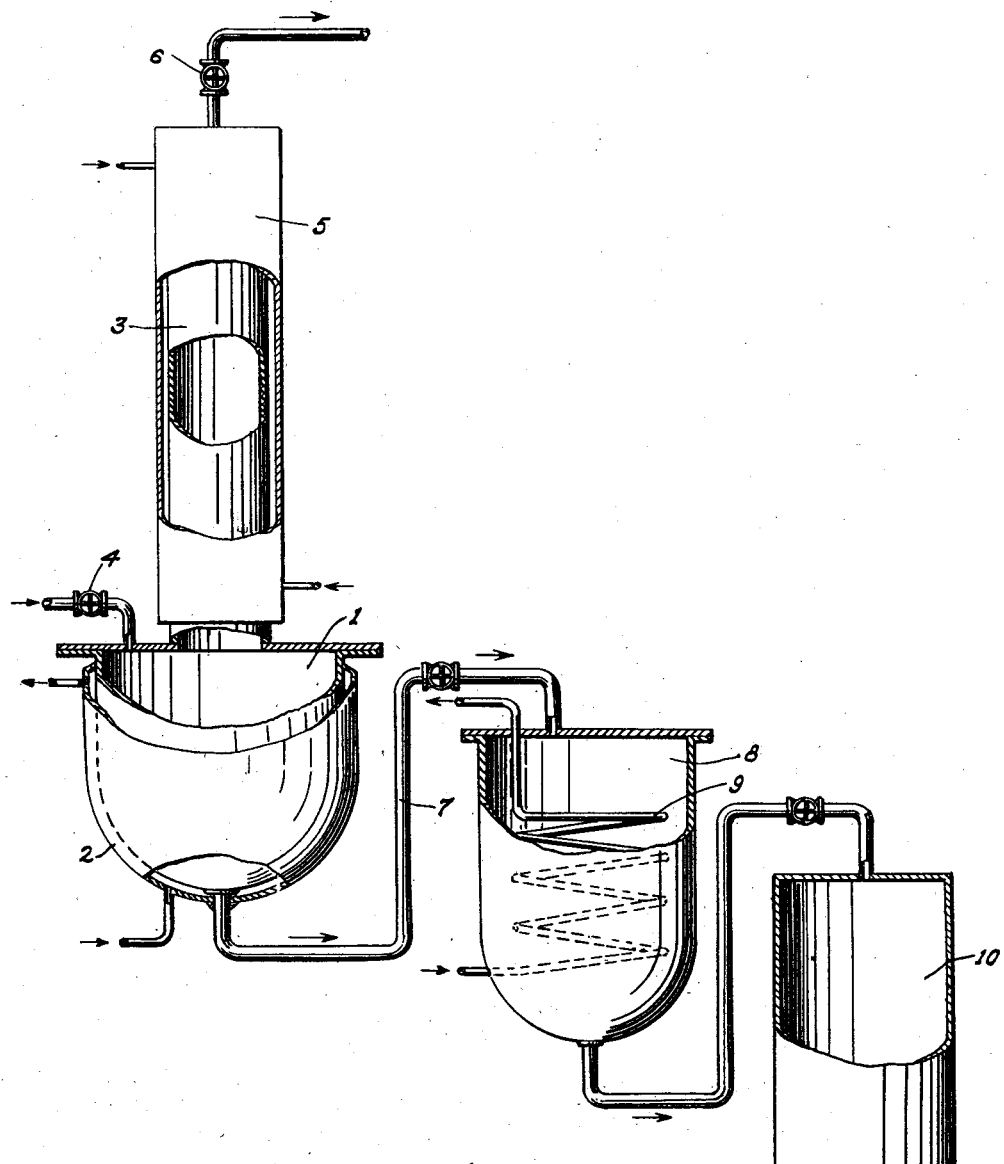

J. C. Vyverberg Jr  INVENTOR

BY

ATTORNEY

Patented July 16, 1946

2,404,260

UNITED STATES PATENT OFFICE 2,404,260

METHOD OF TREATING SPENT ACID

John Cornelius Vyverberg, Jr., Woodbury, N. J., assignor to E. I. du Pont de Nemours & Company, Wilmington, Del., a corporation of Delaware Application January 16, 1942, Serial No. 427,019

5 Claims. (Cl. 23—161)

This invention relates to a new and improved process for the treatment of spent acids contaminated with nitrated material, and more particularly to a method for the purification of spent acid resulting from the nitration of pentaerythritol.

In the nitration of organic compounds, the usual procedure is to employ a mixture of sulfuric and nitric acid as nitrating means, said organic compounds being contacted directly with the mixture, or being dissolved first in the sulfuric acid with subsequent addition of this solution to strong nitric acid. By either of the foregoing procedures, a spent acid is obtained comprising sulfuric acid, nitric acid, and water. Various methods of separation and recovery of the acid components of such mixtures have been employed, ordinarily comprising denitration processes wherein the nitric acid is removed by passage of steam or hot gases upward through the heated acid mixture.

In the case of a few nitration processes, this step may be carried out desirably by the action of concentrated nitric acid on the starting organic compound in the absence of sulfuric acid or other dehydrating agent. The nitration of pentaerythritol, as disclosed by Naoum, is an outstanding example of this procedure. Under such conditions, the spent acid comprises not a mixture of a relatively high percentage of sulfuric acid with smaller amounts of nitric acid and water, but instead an aqueous nitric acid solution containing a small quantity of dissolved nitrated material. Because of the explosive nature of said dissolved material, the spent nitric acid is unsuitable for direct use where it might ordinarily be employed. Consequently, it has frequently been the practice, where such spent acids resulted, to discard them as not warranting further treatment. The direct disposal of such acids in this manner meant the loss of valuable chemical material and at the same time created an additional stream pollution problem.

The object of the present invention is a method of treating and purifying spent acids resulting from nitrations in which no dehydrating agent has been employed. A further object is such a method in which the spent acid has a nitric acid content greater than 50%. A still further object is a method for the purification of a sulfuric-free spent acid resulting from the nitration of pentaerythritol. Additional objects will be disclosed as the invention is described more in detail hereinafter.

I have found that the foregoing objects are accomplished and the disadvantages of the prior art procedures overcome, when I introduce spent acids of the nature described into suitable containers and maintain them in boiling condition for a time interval sufficient to effect the decomposition of the nitrated product present as contamination in the acid. During said boiling, any considerable loss of volatilizable constituents is prevented by refluxing. I carry out the boiling under at least atmospheric pressure and, in the case of pentaerythritol tetranitrate spent acid, I employ a pressure of approximately one atmosphere. Under certain conditions, however, where it is desired to raise the boiling point in order to bring about higher temperature and certain decomposition of more refractory materials, I may use pressures greater than atmospheric.

Figure 2:
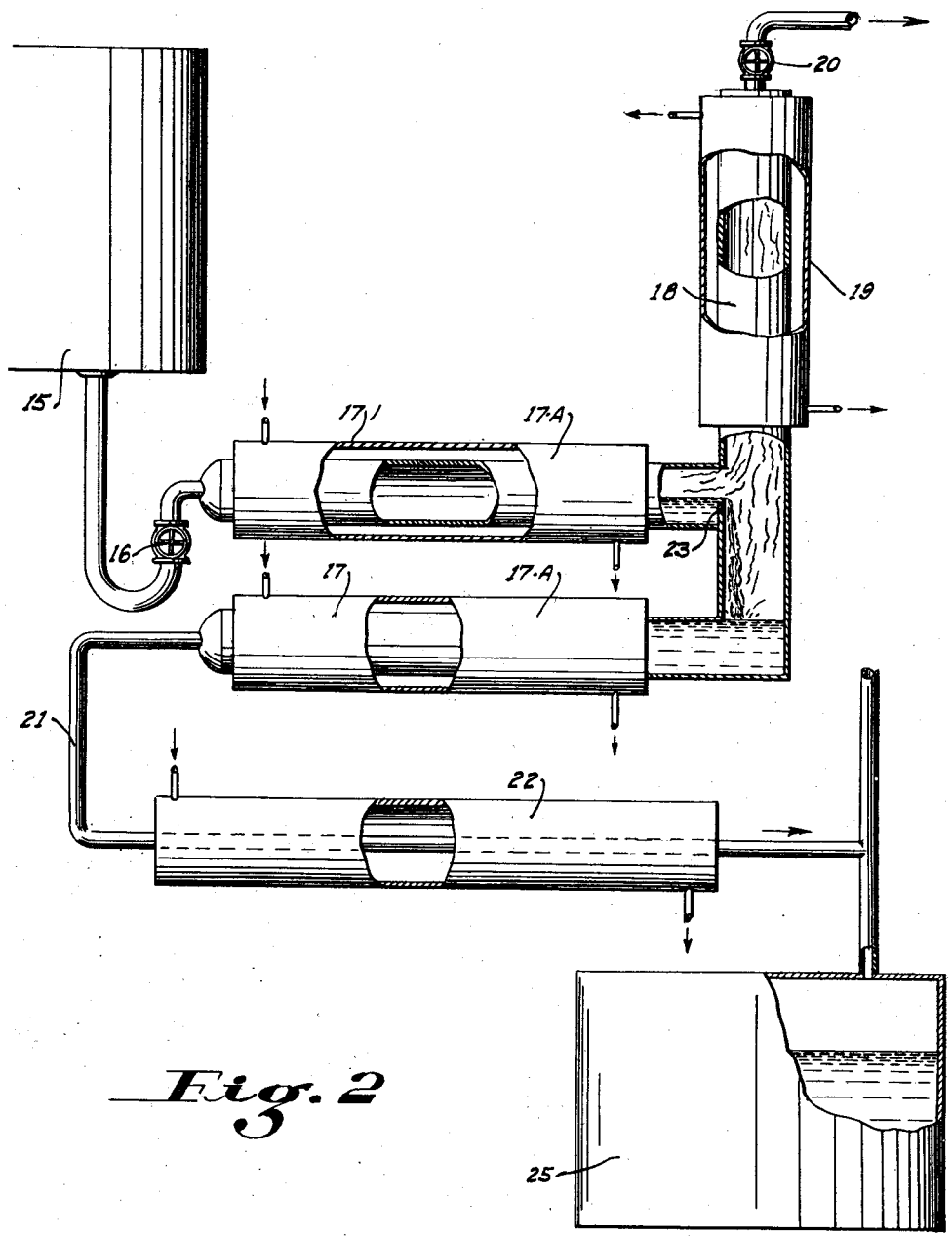

The method and apparatus may be illustrated more clearly by reference to the accompanying drawings, in which Fig. 1 represents an apparatus adapted for a batch process according to my invention, while Fig. 2 shows a somewhat different apparatus assembly designed for continuous operation.

Referring to Fig. 1, sulfuric-free spent acid resulting from the nitration of pentaerythritol, and comprising nitric acid of over 50% concentration contaminated with a certain amount of nitrated material dissolved in said nitric acid, is run from a storage tank past valve 4 into vessel 1 heated by steam jacket 2. The acid in 1 is heated to boiling. The vapors are condensed in refluxing column 3, which is surrounded by a jacket 5 containing a cooling medium. The valve 6 is maintained in open position, since refluxing at approximately atmospheric pressure is desired in the case of pentaerythritol tetranitrate spent acid. By control of the opening of this valve and by installation of a pressure gage, the pressure in the system and the boiling temperature of the acid can be controlled. This latter temperature in the case of pentaerythritol tetranitrate spent acid is around 115–120° C. at atmospheric pressure. When NO₂ is no longer given off, the purification of the acid may be considered sufficient. The NO₂ evolved passes through valve 6 and may be absorbed or disposed of in any desired manner. At the end of the purification process, the acid is transferred to the cooling vessel 8 through pipe 7. The cooling vessel contains the cooling coil 9. Ultimately the nitric acid may be transferred from 8 to storage tank 10 or to any desired receptacle.

Fig. 2 illustrates an apparatus adapted for continuous treatment of spent acid according to the invention. Acid resulting from the nitration of pentaerythritol is allowed to flow by gravity from storage tank 15 past valve 16 into horizontal tubes 17 surrounded by jackets 17a filled with heating medium maintained at such temperature that the acid will boil during its passage through said tubes. The dam 23 in the upper boiling tube maintains the acid at the desired level. The vapors evolved during the boiling pass up through column 18 surrounded by cooling jacket 19. The vapors are largely condensed and only a small volume of gas, mainly $NO_2$, passes out through the top of the column and the valve 20. Again this valve is allowed to remain open during the refluxing, so that boiling will take place at atmospheric pressure, which is the condition desired with pentaerythritol tetranitrate spent acid. The flow of spent acid through the boiling tubes is so controlled that the time interval is sufficient to effect the decomposition of the nitrated material dissolved in the acid. The purified acid flows from the boiling tubes by way of 21 through a cooling vessel 22 containing cold water or other suitable heat transfer medium in indirect heat transfer relationship to the acid. While a straight passage for the hot acid is indicated through 22, it may pass through a coil for better cooling efficiency. The cooled acid goes to storage vessel 25 for further disposal as desired.

In the drawings, the refluxing arrangement is shown as a straight column with external cooling. It may be desirable to employ as the refluxer other arrangements of condensers, for example a cascade of superposed horizontal tubes with individual or common cooling jackets.

The following example is a specific embodiment showing the effect of the process according to my invention on contaminated spent acids of the type described.

*Example 1*

Two hundred and fifty grams of spent acid resulting from the nitration of pentaerythritol and the separation of its tetranitrate was fed into an acid-resistant vessel. The acid composition comprised between 70 and 80% $HNO_3$, 0.01% $NO_2$, and 1.24% ether-extractable material, mainly dissolved nitration products of pentaerythritol. The acid was heated and attained its boiling point in 6 minutes. The total heating time was 30 minutes and evolution of $NO_2$ ceased after 11 minutes. At the end of the treatment, the spent acid had a slightly lower nitric percentage and contained 0.13% $NO_2$ and 0.09% ether-extractable material.

*Example 2*

A similar acid in the amount of 500 grams was heated a total time of 28 minutes and showed a final content of ether-extractable material of 0.05%. The disappearance of the greater part of the ether-soluble material in both cases indicated that decomposition of the nitrated content present had been nearly complete.

In the foregoing examples, the invention has been illustrated by use of spent acid resulting from the nitration of pentaerythritol. It is with such acids that the invention will possibly have its greatest use because of the importance of pentaerythritol tetranitrate. It is applicable advantageously, however, in the case of various spent acids free from sulfuric or other dehydrating agent, that is to say with acids resulting from nitrations with concentrated nitric acid alone. With such nitrations, where the desired nitration product is filtered from the acid rather than being separated by drowning, the nitric content of the spent acid is commonly above 50%, and the acid will have a boiling point between 110 and 125° C. at atmospheric pressure. In the case of pentaerythritol tetranitrate, such temperatures are satisfactory for the substantially complete decomposition of the nitrated material in the acid, and the process will be carried out under atmospheric conditions. The invention may be applied also in the case of spent acids resulting from the preparation of such materials as cyclotrimethylene trinitramine, trimethylol methyl methane trinitrate, dimethylol methyl methane dinitrate, and the like. In the case of such acids where the nitrated material present in the spent acid has greater thermal stability, it will be desirable to carry out the boiling under pressure greater than atmospheric, with consequently higher boiling points.

It will be understood that the nitrated material present in the spent acid, and which requires decomposition, may be the compound desired as the final product in the nitration, or may be a contaminating material. In the case of pentaerythritol, for example, a certain amount of dipentaerythritol is frequently present and difficult to separate. Under such conditions, a small quantity of dipentaerythritol hexanitrate will be present as a nitration product along with a predominating amount of pentaerythritol tetranitrate. Since dipentaerythritol hexanitrate possesses a higher degree of solubility than pentaerythritol tetranitrate, this contaminating product doubtless constitutes a considerable portion of the material requiring decomposition during my process.

My invention has been described at length in the foregoing. It will be understood, however, that many variations may be introduced in details and conditions of operation and in types of material treated, without departure from the scope of the invention. I intend to be limited, therefore, only by the following patent claims.

I claim:

1. The process of purifying a spent nitration acid substantially free from dehydrating agent but contaminated with nitrated material, and having a nitric acid content of over 50%, which process comprises maintaining said acid at boiling temperature under at least substantially atmospheric pressure, preventing any considerable loss of normally liquid constituents during said boiling, and thereby effecting the decomposition of substantially all of the nitrated impurity present.

2. The process of purifying a spent nitration acid substantially free from dehydrating agent but contaminated with nitrated material and having a nitric acid content of over 50%, which process comprises maintaining said acid at boiling temperature under at least substantially atmospheric pressure, effecting said boiling under refluxing conditions, and thereby effecting the decomposition of substantially all of the nitrated impurity present.

3. The process of purifying a spent nitration acid substantially free from dehydrating agent but contaminated with nitrated material and having a nitric acid content of over 50%, which process comprises maintaining said acid at a temperature between 115 and 125° C., causing said acid to boil under refluxing conditions, and thereby effecting the decomposition of the greater part of the nitrated impurity present.

4. The process of purifying spent acid resulting from the nitration of pentaerythritol with concentrated nitric acid, which process comprises maintaining said spent acid at boiling temperature for a sufficient length of time to effect the decomposition of substantially all the nitrated material present in the acid, and carrying out said boiling under refluxing conditions.

5. A continuous process for the purification of spent acid resulting from the nitration of pentaerythritol with concentrated nitric acid, which process comprises causing said spent acid to flow continuously through at least one heating vessel, maintaining said acid at boiling temperature during said passage, effecting the return to the system of substantially all the vapors of normally liquid materials evolved from the boiling acid, causing said acid to be retained in the boiling vessels until substantially all the nitrated content has been decomposed, continuously cooling and removing purified spent acid from the system and continuously introducing untreated spent acid into the boiling vessels to replace that flowing out.

JOHN CORNELIUS VYVERBERG, Jr.